C. E. LA FLEUR.
AUTOMOBILE TIRE.
APPLICATION FILED SEPT. 13, 1907.

931,879.

Patented Aug. 24, 1909.

Witnesses
R. M. Kelly
R. F. Driscoll

Inventor
Charles E. La Fleur
By
Attorney

UNITED STATES PATENT OFFICE.

CHARLES E. LA FLEUR, OF PHILADELPHIA, PENNSYLVANIA.

AUTOMOBILE-TIRE.

931,879.     Specification of Letters Patent.     Patented Aug. 24, 1909.

Application filed September 13, 1907. Serial No. 392,622.

*To all whom it may concern:*

Be it known that I, CHARLES E. LA FLEUR, of the city and county of Philadelphia and State of Pennsylvania, have invented an Improvement in Automobile-Tires, of which the following is a specification.

My invention has reference to automobile tires, and consists of certain improvements which are fully set forth in the following specification, and shown in the accompanying drawings, which form a part thereof.

The object of my invention is to provide a construction of automobile tire which shall have great resistance to wear while retaining its elasticity and which shall also be practically proof against being punctured.

My invention consists in providing the tire at its greatest diameter with a tread or inlay composed of a series of layers of woven fibers embedded in rubber and so formed that the ends of the fibers are directed outward to receive the wear.

My invention also embodies details of construction which, together with the features above specified, will be better understood by reference to the drawings, in which:—

Figure 1:
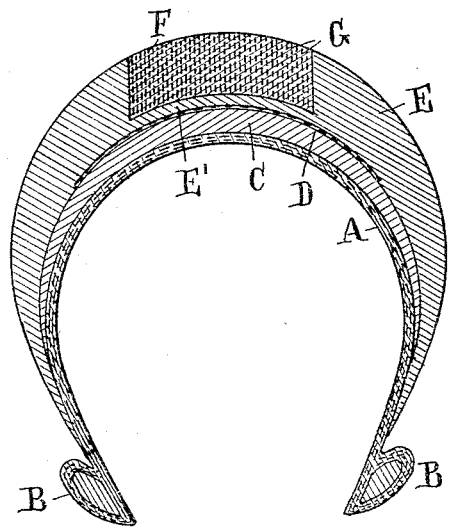
Figure 3:
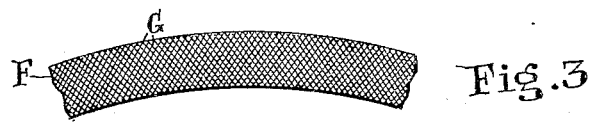
Figure 2:
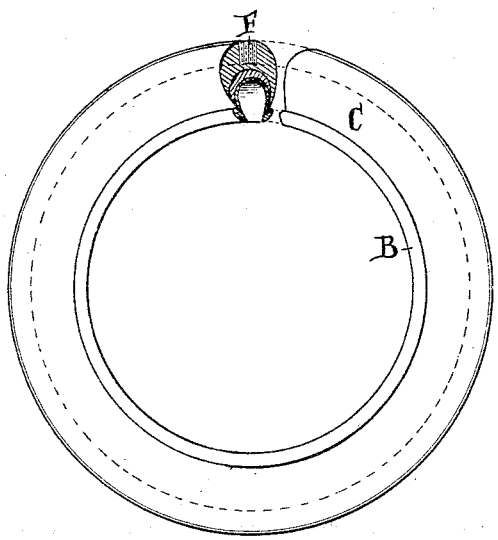

Figure 1 is a cross section through an automobile tire embodying my invention; Fig. 2 is a side elevation of a complete tire showing part broken away; and Fig. 3 is a side elevation of a portion of the fiber inlay.

A is the inner fabric case or carcass and is provided on its sides with the usual beads B for attachment to the felly of the wheel.

C is a layer of soft rubber constituting the padding.

D is a layer of open mesh fabric forming the breaker strip.

E is the cover formed of rubber and F is the tread and embodies the essential feature of my invention. The tread is formed as an inlay and like a rectangular band. It extends all around the tire and embedded to its full depth in the cover E, as shown. Moreover, all of the parts are vulcanized together and form an integral structure. Specifically, this tread F is formed of a series of layers of woven fabric G arranged side by side and all united by an inclosing body of rubber. A suitable way of making this tread is to arrange the woven strips alternately with strips of rubber which are then pressed into a homogeneous mass and vulcanized. In my preferred form, I arrange the fibers of the woven fabric diagonally, as shown in Fig. 3, so that the end of every fiber is presented to the wearing surface, thereby imparting great resistance and avoiding any possibility of fraying or tearing out of the fibers. While I prefer that all of the fibers shall present their cross section to the wearing surface, I do not restrict myself thereto, as a large part only of said fibers might be so arranged.

The depth of the tread or inlay F may be varied, but preferably it should rest upon a layer of rubber E′ of the cover E and should be almost of the maximum depth of the cover. It is also evident that the width of the tread may be varied to suit the character and weight of the vehicle. The fiber may be of vegetable, mineral or animal material but preferably of cotton.

The general form of the tire is immaterial as the essential feature of my invention resides in the tread portion F combined with the cover.

While I prefer the construction shown as being excellently adapted for commercial use, the details may be modified without departing from the spirit of the invention.

Having now described my invention, what I claim as new, and desire to secure by Letters Patent, is:—

As an article of manufacture an automobile tire casing consisting of an annular shoe made U shaped in cross-section and having gradually increased thickness from the sides to the tread and comprising a fabric case or carcass A, and padding layer C of yielding rubber, a breaker strip D of fabric upon the padding layer, a cover E extending over the padding layer and breaker strip and of gradually increasing thickness as the tread portion is approached from each side and the side portions of the cover separated at their thickest portions to form a wide and very deep annular groove almost the full thickness of the cover, combined with a tread portion secured in said annular groove and composed of layers of woven textile material embedded in rubber and having small elasticity and in which the ends of the fibers of the textile layers are brought to the surface of the tread to receive the wear.

In testimony of which invention, I have hereunto set my hand.

CHARLES E. LA FLEUR.

Witnesses:
LEONARD L. BLIGH,
R. M. HUNTER.